BISTABLE CIRCUIT COMPRISING A NEGATIVE RESISTANCE DEVICE IN COMBINATION WITH A PHOTO-VOLTAIC ELEMENT

Filed Feb. 27, 1962 3 Sheets-Sheet 1

Inventors
ROBERT ANTHONY HYMAN
ARTHUR DERRICK THOMAS
By
Attorney

Inventors
ROBERT ANTHONY HYMAN
ARTHUR DERRICK THOMAS
By
Attorney

Sept. 15, 1964 R. A HYMAN ETAL 3,149,311

BISTABLE CIRCUIT COMPRISING A NEGATIVE RESISTANCE DEVICE IN COMBINATION WITH A PHOTO-VOLTAIC ELEMENT

Filed Feb. 27, 1962 3 Sheets-Sheet 3

Inventors
ROBERT ANTHONY HYMAN
ARTHUR DERRICK THOMAS
By [signature]
Attorney

United States Patent Office 3,149,311
Patented Sept. 15, 1964

3,149,311

BISTABLE CIRCUIT COMPRISING A NEGATIVE RESISTANCE DEVICE IN COMBINATION WITH A PHOTO-VOLTAIC ELEMENT

Robert Anthony Hyman and Arthur Derrick Thomas, London, England, assignors to International Standard Electric Corporation, New York, N.Y., a corporation of Delaware Filed Feb. 27, 1962, Ser. No. 176,078
Claims priority, application Great Britain Mar. 17, 1961
11 Claims. (Cl. 340—173)

This invention relates to bistable electric circuit devices and to apparatus for intelligence storage embodying such devices.

According to the invention, a bistable electric circuit device includes a photo-voltaic element connected in a closed current path with an element having a negative resistance characteristic, whereby when the photo-voltaic element is energized by suitable incident light the device can be caused to adopt either of two stable electrical states.

Energization of the photo-voltaic element to the proper degree for bistable operation of the device depends both on the intensity of the incident light and on its spectral composition, which are chosen by reference to the characteristics of the photo-voltaic element and its associated negative resistance element. In general, correct operation will not necessarily be restricted to the spectral range visible to the human eye but may extend into the ultra-violet or infra-red regions of the spectrum. Except where the context specifically requires otherwise, the term "light" and its equivalent are used in this specification, in accordance with common usage, to embrace both the visible and the near-visible spectral regions.

Any element exhibiting negative resistance between two terminals may be employed, but it is preferred to use the semiconductor device known as the "tunnel diode," since this device provides negative resistance in a two terminal device with fast response times.

The terms "tunnel diode" and "tunnel junction" are now generally used to refer to a family of semiconductor devices having peculiar and useful properties. A "tunnel junction" may briefly be defined as a semiconductor junction in which the active layers have a doping impurity content which grossly exceeds that usual in conventional semiconductor devices such as signal rectifiers. The resulting junction is useless as a rectifier, having an extremely low resistance in both directions, but is characterised by the fact that a section of its forward current characteristic includes a negative-resistance region joined to positive-resistance regions by transitions of infinite resistance. If such a junction is connected to a current source whose current-voltage characteristic intersects both the positive-resistance arms of the junction characteristic, the combination forms a bistable element which can be switched between its two stable states by small triggering currents or voltages.

In the preferred form of the invention the photo-voltaic element is also a semiconductor junction element, and both elements of the device are formed in a common body of semiconductor material.

According to another feature of the invention, a plurality of bistable devices as previously defined are associated to form a multiple-element intelligence storage apparatus. In such an arrangement a plurality of the individual bistable devices may be formed in a common body of semiconductor material; this feature is particularly applicable to co-ordinate storage arrays, in which either the "rows" or "columns" of the array may be formed by strips of semiconductor material along which the individual bistable devices are spaced.

Since the operation of the bistable device according to the invention is dependent upon the energization of the photo-voltaic element by incident light, it is possible to provide a controlling input to the device by variation of the intensity or spectral composition of the incident light. Such a variation may be provided by controlling the intensity of a light source, or by interposing between the source and the device a mask or filter for modifying the incident light. In particular, the bistable device, or an array of such devices, may be arranged for reading information stored in binary digital form on a punched card or photographic film.

The foregoing and other features of the invention will be evident in the following description of two preferred forms thereof. The description refers to the accompanying drawings, in which.

Figures 1, 2:
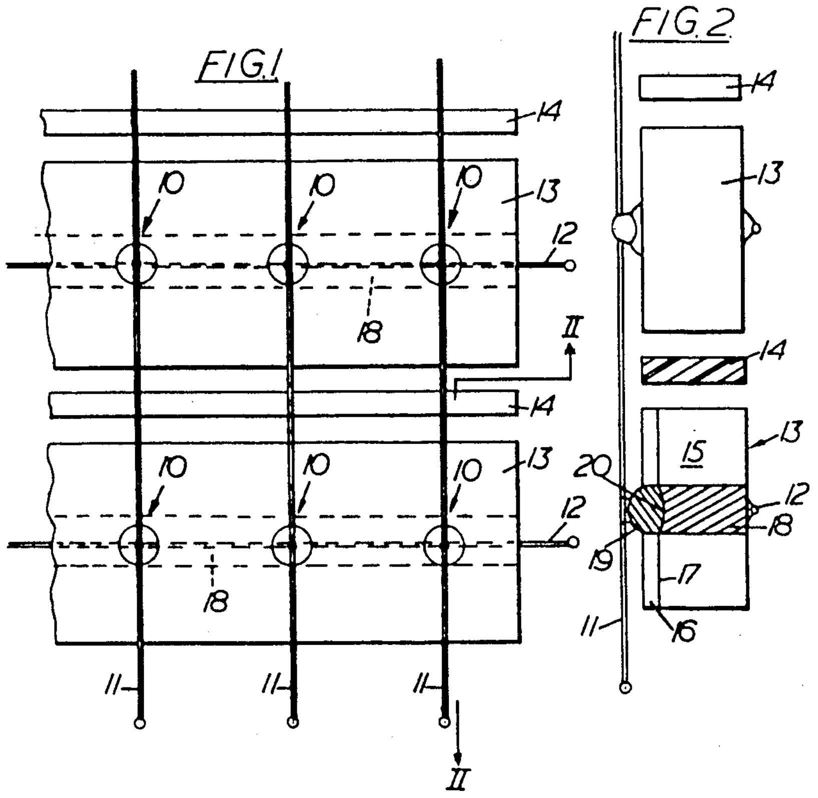
FIG. 1 is a plan view of part of an intelligence store embodying a plurality of bistable devices.
FIG. 2 is a partly-sectioned end elevation of the store shown in FIG. 1.

The store shown in FIG. 1 consists essentially of a number of bistable storage devices, indicated generally by references 10, arranged in a rectangular co-ordinate array and interconnected by column conductors 11 and row conductors 12. In the physical arrangement of the store the bistable devices that together form any given row are formed in one of a series of strips 13 on n-type mono-crystalline silicon. The dimensions of the strips may be approximately one millimetre in width and 0.5 millimetre in thickness; the length of the strip will depend on the number of bistable devices to be accommodated, the spacing between adjacent devices being of the same order as the width of the strip. Insulating barriers 14 are provided between adjacent strips.

The arrangement of the strips and the operation of the individual bistable devices formed therein can be better understood from FIG. 2, in which one of the strips 13 is sectioned through the centre of one of its bistable devices. The strip 13 is shown to consist of a main body 15 of n-type silicon with a p-type surface layer 16 formed by diffusion into the silicon of a suitable doping impurity over the entire surface of one of its wider faces. The p-n junction 17 thus formed constitutes a photo-voltaic element, the diffused surface layer 16 being sufficiently thin for the carriers produced by incident light to penetrate to the junction substantially without loss by recombination. The entire face of the strip thus constitutes a single photo-voltaic cell, and in the presence of suitable incident light an electromotive force will exist between the body 15 of the strip and the surface layer 16.

By a further diffusion process a narrow strip of silicon 18 along the centre line of the strip is given degenerate n-type characteristics. The degenerately-doped strip penetrates completely through the n-type body 15 of the strip of silicon.

The individual bistable devices 10 are formed in the prepared strip by alloying into the surface which carries the photo-voltaic junction 17 a pellet 19 of pure aluminium, the alloyed region contacting the degenerately-doped region 18 so as to form with it a tunnel junction 20. The alloyed region 19 is contiguous with the p-type surface layer 16 of the strip, and the degenerate region 18 is, of course, contiguous with the main body 15 of the n-type silicon. The electrical equivalent of the structure shown in FIG. 2 is thus a circuit consisting of a tunnel-diode element and a photo-voltaic element (the photo-voltaic element being in fact common to all the diodes of the strip). External connections to the device are provided by the row wire 12, which passes along the entire length of the degenerate region 18 and is soldered to it; and by the column wire 11 which is soldered to the aluminium pellet 19 of each device.

Figure 3:
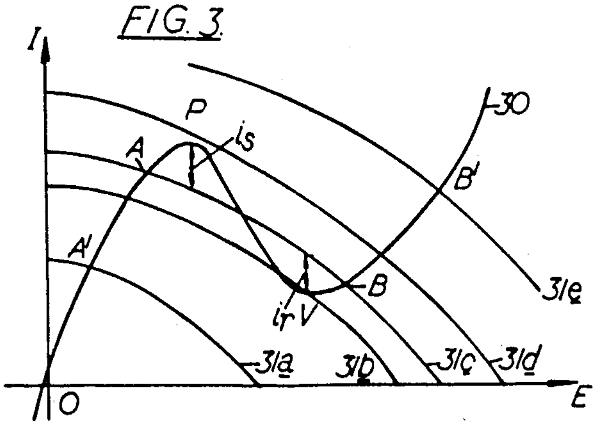
FIG. 3 shows current/voltage characteristics of the elements forming a single bistable device of the store.

The operation of the individual bistable devices which comprise the store can be understood by reference to FIG. 3 of the drawings. In this figure the curve 30 represents the forward current/voltage characteristic of the tunnel junction 20, while the curves 31*a* to 31*e* represent the current/voltage characteristics of the photo-voltaic junction 17 for successively increasing values of the intensity of the incident light, all the curves being represented on common scales of current and voltage.

The tunnel junction characteristic 30 has, for values of the applied voltage increasing from zero in the direction arbitrarily chosen as the forward direction, an initial portion OAP of low positive resistance, a negative-resistance portion PV and a continuing portion VBB[1] of rather higher positive resistance. The transitions between the negative-resistance portion and the two positive-resistance portions of the characteristic pass through points of infinite resistance.

If the tunnel junction whose characteristic is shown at 30 has connected across it the photo-voltaic element whose characteristics for different intensities of incident light are represented by the curves 31*a* to 31*e*, it will be seen that for certain conditions of the photo-voltaic element, such as that represented by the curve 31*c*, the characteristic of the photo-voltaic element intersects both positive arms of the characteristic 30 of the tunnel junction. Thus for the photo-voltaic characteristic 31*c* points A and B represent stable electrical states of the combination. Any curve between the two extremes represented by characteristics 31*b* and 31*d* will give this condition; a characteristic such as 31*c* midway between the two extremes ensures the utmost stability of the combination in either state. For curves such as 31*a* or 31*e* only one stable state, A[1] or B[1] is possible.

When illumination of level corresponding to characteristic 31*c* is initially applied to the bistable device it will adopt stable state A. If now a relatively small trigger current $i_s$ is passed through the tunnel junction in the same sense as the current already flowing therein, the working point of the tunnel junction will move up the characteristic to its peak P; this is an unstable condition, so that the junction switches through its negative-resistance region PV and when the current pulse is removed will be stable in state B. Similarly a reverse current pulse $i_r$ applied to the junction when in state B will return the combination to state A. Thus in the presence of steady illumination sufficient to cause the photo-voltaic element to operate on its characteristic 31*c*, the combination may be switched between its two stable states A and B by the appropriate current pulses passed through the combination by external connections such as the column and row wires 11 and 12 shown in FIGS. 1 and 2.

The two stable states A and B are distinguished by the corresponding values of either current or voltage. In FIG. 3 the left-hand side of the tunnel characteristic 30 has been somewhat expanded in order to show the various possible working conditions more clearly. In arrangements employing practical embodiments of the invention the voltage across the combination at state A may be, perhaps, 50 millivolts, while that at state B may be as much as 300 millivolts, thus providing a switching ratio for the device of 1:6. In view of the extremely fast switching times available from tunnel junctions, the overall switching time of the complete device, as employed in any practicable store, will be determined largely by delay times in the associated drive apparatus.

Figure 4:
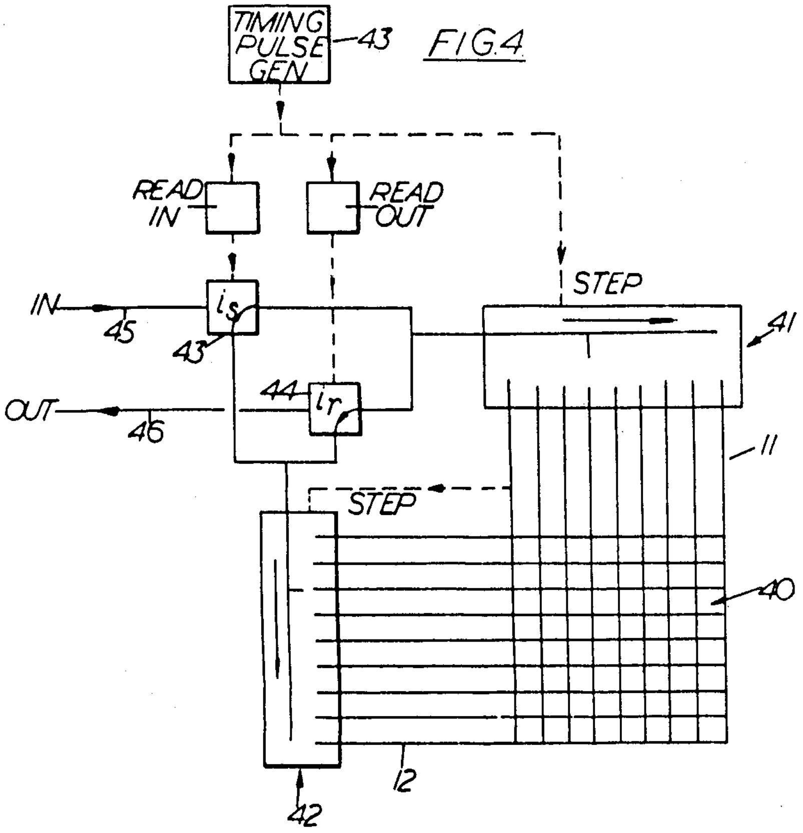
FIG. 4 is a block diagram of the store shown in FIGS. 1 and 2 and its ancillary apparatus.

FIG. 4 of the drawings shows a block diagram of the store whose physical configuration is shown in FIGS. 1 and 2 in combination with its ancillary apparatus. The store 40 is represented as a simple co-ordinate store for storing information in binary digital form, simple sequential scanning of rows and columns being provided. The column drive conductors 11 are connected to the terminals of some form of column access selector 41, and the row conductors 12 are similarly connected to a row access selector 42. The access selectors are stepped by pulses supplied from the timing pulse generator 43 so as to scan from left to right along each row of the store in turn. Selection and drive for either reading-in or reading-out of information is effected by means of read-in and read-out current generators 43 and 44 respectively, either of which can be connected through the access selectors 41 and 42 between an intersecting pair of column and row conductors 11 and 12. The current generators 43 and 44 provide substantially constant current sources for the select current $i_s$ and the reading current $i_r$ of opposite sign. Thus, if while the access selectors 41 and 42 are in any given position the read-in current generator 43 is pulsed by an input signal applied on conductor 45, the bistable device at the intersection of the selected row and column conductors will be switched from stable state A to stale state B, as described with reference to FIG. 3.

It will be understood that apart from the actual switching impulse $i_s$ no driving power, apart from that represented by light incident on the photo-voltaic elements of the store, is necessary to maintain the stored information.

Reading of the stored information is effected by applying the reverse read-out current pulse $i_r$ between a pair of selected column and row conductors, thus switching the selected bistable device back to state A if it was previously in state B. A detector circuit within the read-out current generator 44 detects the change in the potential difference between the selected row and column conductors which occurs as the selected device switches back from state A to state B, and delivers a corresponding output on conductor 46. Devices already in state A are not switched by the read-out pulse and deliver no output.

The entire contents of the store may be cancelled by depriving the photo-voltaic elements of their energizing incident light; all the bistable elements will revert to some state such as A[1], and will return to their normal stable state A when normal illumination is restored.

In some applications it may be desirable to read stored information by applying a further switching current pulse $i_s$ to each device in turn; only devices previously *unswitched* will be affected by this pulse, so that at the end of the reading operation all devices will be stable in state B. Similarly a momentary increase in the level of the incident light can be employed to move all the devices of the store to some state such as B[1], the devices reverting to stable state B when the normal level of illumination is restored.

It will be evident from the foregoing paragraph that the light energy incident upon the photo-voltaic elements of the store can be considered as one of the store inputs, since switching of the associated bistable devices can to some extent be effected by variation of its level. Hitherto this has been described only as a means for switching all the devices of the store to a common state, but the possibility evidently exists of selectively controlling the incident light on each individual bistable device and thereby providing an additional input to the store which can significantly modify the stored information. This can be effected only if the photo-voltaic elements of the individual devices are electrically isolated from each other. In the arrangement shown in FIGS. 1 and 2, the photo-voltaic junction 17 formed in each silicon strip 13 is effectively common to all the bistable devices in that strip; thus, while individual switching of complete rows of the store by controlling the light input is perfectly possible, individual control of the devices within a row is more difficult.

Figure 5:
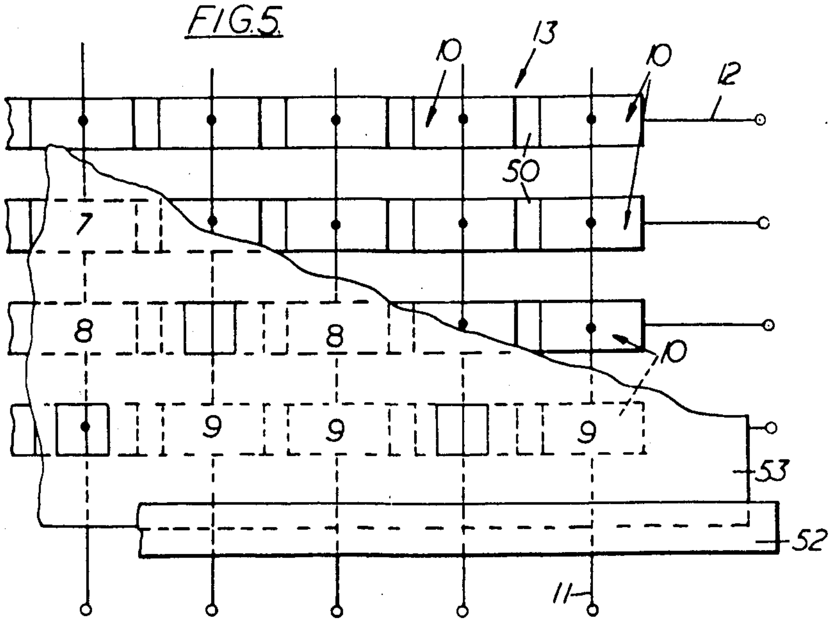
FIG. 5 is a plan view of part of a punched/card reading apparatus, embodying the intelligence store of FIGS. 1 and 2 in a modified form.

FIG. 5 of the drawings shows an apparatus for reading information from punched cards, employing a modified form of the store shown in FIGS. 1 and 2 in which this disadvantage is overcome. The physical construction of the store is exactly the same as that shown in FIGS. 1 and 2, except in that adjacent bistable devices 10 in each of the silicon strips 13 are separated by means of grooves 50, formed by removing the surface of the strip which carries the diffused p-type layer 16 to a level below that of the photo-voltaic junction 17. The individual devices in any one strip thus have only the one common connection represented by the row conductor 12. They can be individually controlled by variation of the light incident upon the device.

Figure 6:
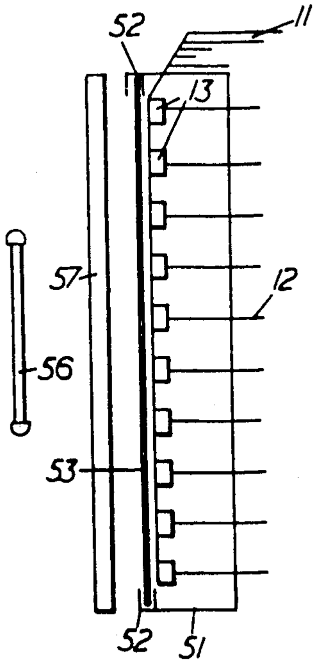
FIG. 6 is a diagrammatic side elevation of the apparatus shown in FIG. 5.

FIG. 6 shows diagrammatically the arrangement of the card reader. The silicon strips 13 carrying the bistable devices are supported within a light-proof enclosure 51, and a card holder, indicated in rudimentary form by the grooved supports 52, enabling a punched card 53 to be supported close to the active surface of the silicon strips 13 with each of its possible hole locations aligned with an individual bistable element as shown in FIG. 5. Light from a source 56, diffused by a screen 57, is passed through the punched holes in the card 53 to energize the corresponding devices of the store, one in each column which will adopt the stable state A shown in FIG. 3. The remaining devices will adopt some such state as $A^1$. If now a current pulse of value $i_s$ is applied between the commoned row wires 12 and each column wire 11 in turn the appropriate device in each column will be switched through to stable state B, giving an indication on the appropriate wire of the information transferred from the card into the selected column of the store.

The apparatus is set for reading by the act of inserting the card 53 between the light source and the reader. Cancellation of the stored information can be effected merely by withdrawing the card since as the unpunched edge of the card first occults and then exposes each device it will be switched to a state such as $A^1$ in FIG. 3 and then back to its normal stable state A. The speed of reading will be limited only by the speed of operation of the access selector and the current generator. Only a single access selector and current generator is required.

Although the reader shown in FIGS. 5 and 6 has been described in a form applicable for reading information from a punched card, it is evidently capable of use with other forms of permanent information storage. It may, for example, be made responsive to the presence of light and dark areas in a photographic film or other medium, or to the presence of differently coloured areas in such a film. The essential criterion is that the photo-voltaic element should have two possible energized states as determined by the possible levels of incident illuminations one falling within and one without the area of bistable operation bounded by the curves 31*b* and 31*d* in FIG. 3.

It will be understood that any suitable semiconductor material may be used in the construction of the arrangements shown in FIGS. 1, 2 and 5, and materials other than aluminium used to form the alloyed areas 19. Furthermore although the construction of the device has been described by reference to diffusion processes, its manufacture by other means, for example by the epitoxial growth of layers deposited from the vapour phase, is perfectly possible. In such an alternative process it might be possible and advantageous to form the two elements of the bistable device of different semiconductor materials.

What we claim is:

1. A bistable electrical circuit device comprising an element responsive to radiant energy to produce an electrical signal; an element having a negative resistance region of operation between two positive resistance regions in its voltage-current characteristic; conductive means connecting said elements in parallel circuit, said elements being so dimensioned relative to each other that said negative resistance element is operated stably in one of said positive resistance regions when said radiant energy responsive element is subjected to an intensity of radiation within a predetermined range; and means connected to said conductive means for applying bipolar pulse signals to selectively condition said negative resistance element to operate stably in either of said positive resistance regions while said radiant energy responsive element is exposed to said intensity of radiation within said predetermined range.

2. A device according to claim 1, wherein the radiant energy responsive element and the negative-resistance element are semiconductor junction elements formed in a common body of semiconductor material.

3. A device according to claim 2, wherein the radiant energy responsive element is formed by the junction between a surface layer of the semiconductor body and the underlying semiconductor material, the said surface layer and underlying material being of opposite conductivity types.

4. A device according to claim 3 wherein the negative-resistance element comprises a tunnel junction between regions of the semiconductor body of opposite conductivity types.

5. A device according to claim 4 wherein the said regions are contiguous one with the surface layer and the other with the underlying material which together form the radiant energy responsive element.

6. Intelligence storage apparatus including a plurality of bistable devices as claimed in claim 1.

7. Intelligence storage apparatus including a plurality of bistable devices as claimed in claim 2, wherein at least two of the said devices are formed in the same common body of semiconductor material.

8. Apparatus according to claim 7 wherein the devices formed in a common body of semiconductor material have a single effectively common electrical connection and are otherwise electrically isolated from each other.

9. Apparatus according to claim 6 including a plurality of conductors forming a co-ordinate array of current paths, each bistable device being electrically connected between a pair of intersecting conductors and being so arranged that externally originating signals, when applied to said pair of conductors, are capable of determining, at least in part, the stable state adopted by the bistable device at the intersection of said pair when energized by said incident light.

10. Apparatus as claimed in claim 9 including a plurality of strips of semiconductor material in each of which the bistable devices are integrally formed at intervals along its length, the devices in any one strip having a common electrical connection and one device in each strip having a second common electrical connection with one device in each other strip.

11. Apparatus responsive to the presence of areas of differing radiant energy transmission characteristics in sheet material, including intelligence storage apparatus as claimed in claim 6 and means for interposing sheet material between said storage apparatus and a source of radiant energy, whereby the electrical state adopted by each bistable device is determined by the radiant energy transmission characteristic of the opposed area of the sheet material.

References Cited in the file of this patent

UNITED STATES PATENTS

| | | |
|---|---|---|
| 2,848,535 | Hunt | Aug. 19, 1958 |
| 3,038,085 | Wallmark | June 5, 1962 |
| 3,050,684 | Sclar | Aug. 21, 1962 |

OTHER REFERENCES

IBM Technical Disclosure Bulletin, vol. 3, No. 4; 1960, "Light Powered Oscillator," S. L. Miller.

1960 International Solid-State Circuits Conference, pages 16 and 17, "Esaki Diode Logic Circuits," Neff, Butler, Critchlow.